(12) United States Patent
Doerr et al.

(10) Patent No.: US 7,561,807 B2
(45) Date of Patent: Jul. 14, 2009

(54) USE OF BEACONS IN A WDM COMMUNICATION SYSTEM

(75) Inventors: Christopher Richard Doerr, Middletown, NJ (US); Peter J. Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 550 days.

(21) Appl. No.: 11/333,106

(22) Filed: Jan. 17, 2006

(65) Prior Publication Data

US 2007/0166048 A1    Jul. 19, 2007

(51) Int. Cl.
*H01S 3/13* (2006.01)
*H04B 10/04* (2006.01)
*H04B 10/12* (2006.01)
*H04B 10/00* (2006.01)
*G02F 2/02* (2006.01)
*H01S 3/098* (2006.01)

(52) U.S. Cl. .................. 398/188; 398/201; 398/203; 398/204; 359/326; 372/9; 372/16

(58) Field of Classification Search ......... 398/203–204, 398/188, 201; 359/326; 372/9, 18
See application file for complete search history.

(56) References Cited

U.S. PATENT DOCUMENTS

| | | | |
|---|---|---|---|
| 7,085,499 B2 * | 8/2006 | Yap et al. ................... 398/183 |
| 7,123,402 B1 * | 10/2006 | Doerr et al. ................ 359/326 |
| 2003/0185255 A1 | 10/2003 | Ye et al. ....................... 372/18 |
| 2005/0018724 A1 * | 1/2005 | Da Silva et al. .............. 372/32 |
| 2006/0263096 A1 * | 11/2006 | Dinu et al. .................. 398/187 |

FOREIGN PATENT DOCUMENTS

WO    WO 02/099939 A2    12/2002
WO    WO 2006/124208 A1    11/2006

OTHER PUBLICATIONS

Holzwarth, R. Zimmermann, M. Udem, T. Hansch, T.W. Max-Planck-Inst. fur Quantenoptik, Garching; "Optical clockworks and the measurement of laser frequencies with amode-locked frequency comb", Quantum Electronics, IEEE Journal of Publication Date: Dec. 2001 vol. 37, Issue: 12.*

(Continued)

*Primary Examiner*—Ken N Vanderpuye
*Assistant Examiner*—Danny W. Leung

(57) ABSTRACT

A WDM communication system having two optical-frequency comb sources (OFCSs) that are substantially phase-locked to one another, with one of these OFCSs used at a transmitter to produce a WDM communication signal and the other OFCS used at a receiver to produce multiple local-oscillator signals suitable for homodyne detection of the WDM communication signal received from the transmitter. In one embodiment, the transmitter has (i) a first OFCS adapted to generate a first frequency comb and (ii) an optical modulator adapted to use the first frequency comb to generate a WDM communication signal having at least two beacon lines for transmission to the receiver. The receiver has a second OFCS adapted to produce a second frequency comb having the beacon frequencies, with the phases of the corresponding comb lines being locked to the phases of the beacon lines of the received WDM signal.

22 Claims, 8 Drawing Sheets

OTHER PUBLICATIONS

Bennett, S. Cai, B. Burr, E. Gough, O. Seeds, A.J. Dept. of Electron. & Electr. Eng., Univ. Coll. London; "1.8-THz bandwidth zero-frequency error, tunable optical combgenerator for DWDM applications", Photonics Technology Letters, IEEE Publication Date: May 1999 vol. 11, Issue: 5 On pp. 551-553.*

Bilodeau, F. Johnson, D.C. Theriault, S. Malo, B. Albert, J. Hill, K.O. Communication Res. Centre, Ottawa Ont.; "An all-fiber dense wavelength-division multiplexer/demultiplexerusing photoimprinted Bragg gratings", Photonics Technology Letters, IEEE Publication Date: Apr. 1995 vol. 7, Issue: 4 On pp. 388-390.*

U.S. Appl. No. 11/296,996, filed Dec. 8, 2005, Doerr.

"1 Gbit/s PSK Homodyne Transmission System Using Phase-Locked Semiconductor Lasers," by J.M. Kahn, Photonics Technology Letters, IEEE vol. 1, Issue 10, Oct. 1989, pp. 340-342.

"Optical 90° Hybrid Costas-Type Receivers," by W.R. Leeb, Electronics Letters, vol. 26, Issue 18, Aug. 30, 1990, pp. 1431-1432.

"20 Photon/Bit 565 Mbit/s PSK Homodyne Receiver Using Synchronization Bits," by B. Wandernoth, Electronics Letters, vol. 28, Issue 4, Feb. 13, 1992, pp. 387-388.

"Optical Homodyne PSK Receiver: Phase Synchronization by Maximizing Baseband Signal Power," by K.H. Kudielka and W. Klaus, Lasers and Electro-Optics Society 1999, 12th Annual Meeting (LEOS '99) IEEE, vol. 1, Nov. 8-11, 1999, pp. 295-296.

* cited by examiner

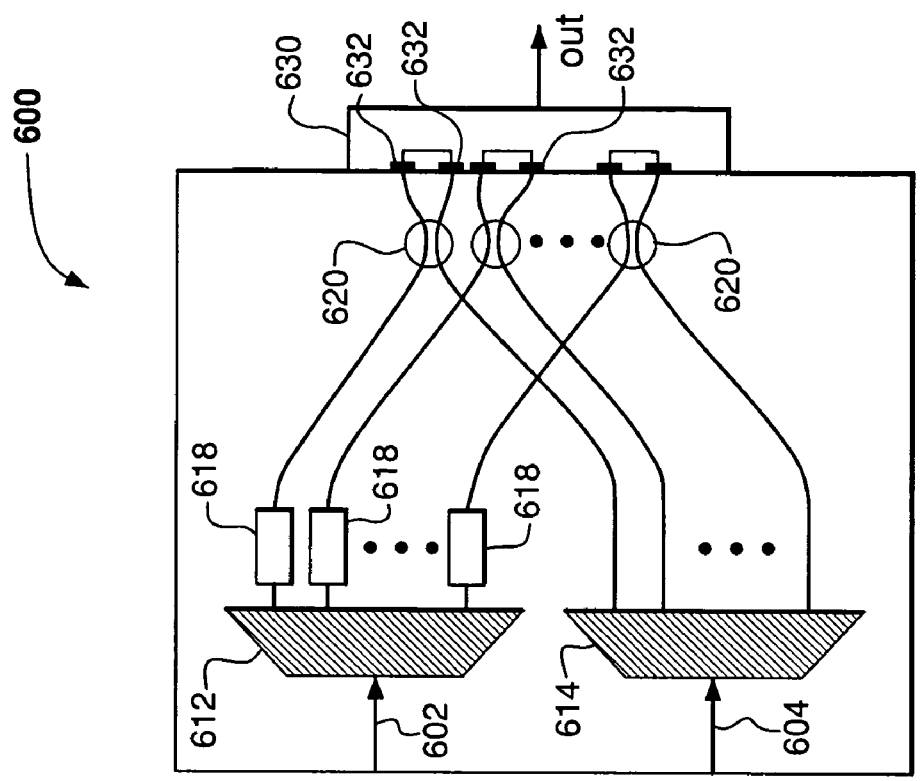
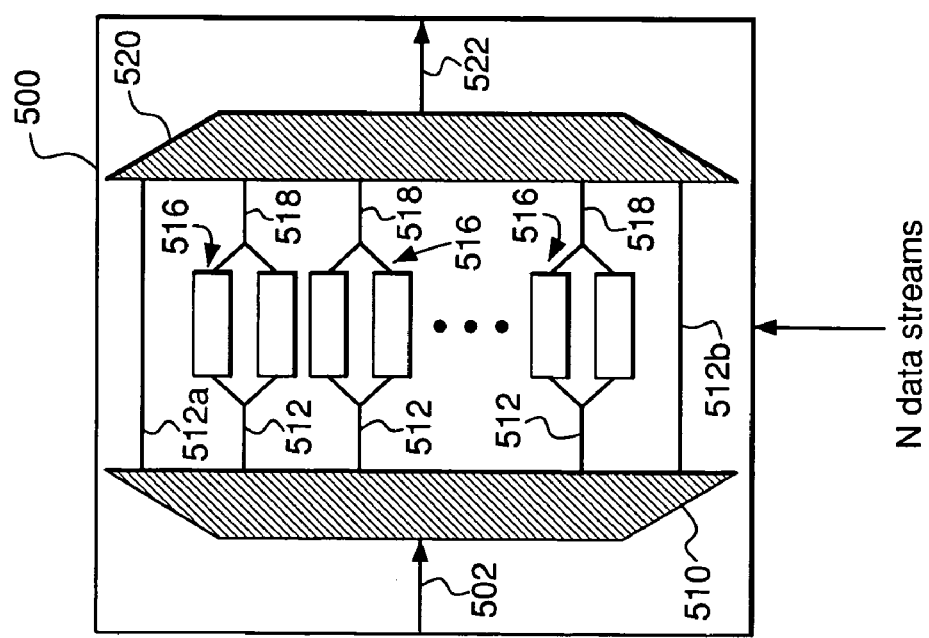
FIG. 6
FIG. 5

USE OF BEACONS IN A WDM COMMUNICATION SYSTEM

CROSS-REFERENCE TO RELATED APPLICATIONS

The subject matter of this application is related to that of U.S. patent application Ser. No. 11/333,105, filed on the same date as the present application and now issued as U.S. Pat. No. 7,123,402, which is incorporated herein by reference in its entirety.

BACKGROUND OF THE INVENTION

1. Field of the Invention

The present invention relates to optical communication equipment and, more specifically, to equipment for optical wavelength division multiplexing (WDM) communication systems.

2. Description of the Related Art

An optical WDM communication system is designed to use optical signals having multiple carrier wavelengths (frequencies). Each carrier wavelength can be individually modulated with data and combined with other modulated wavelengths. The resulting optical WDM signal is transmitted over an optical communication link, e.g., an optical fiber, from a transmitter to a receiver, where the modulated wavelengths are separated and individually processed to recover the data. This ability of a WDM system to transmit many data streams in parallel advantageously enables the system to have a relatively large transmission capacity.

One type of modulation that is often used in WDM systems is phase-shift keying (PSK). More specifically, PSK modulation encodes data onto the carrier wavelength using the wavelength phase. For example, in its simplest (binary) form, PSK encodes digital "ones" and "zeros" as two respective phases that are 180 degrees apart. Other forms of PSK can similarly encode data using more than two phases.

One method of decoding a PSK-modulated signal at the receiver is based on homodyne detection, in which the received PSK-modulated signal is combined with a local oscillator (LO) signal. The intensities of the resulting interference signals are then measured to determine the modulation phase. It is well known in the art that PSK modulation combined with homodyne detection can advantageously provide a significant sensitivity improvement over other optical modulation-detection combinations.

One problem with the use of homodyne PSK is that the homodyne detection of each modulated signal utilizes a LO signal that is phase-locked to the carrier wavelength of that modulated signal. However, at the receiver, a phase-lock to the carrier wavelength is relatively difficult to achieve because the PSK causes pseudo-random phase variation in the received signal. Also, the task of providing multiple phase-locked LO signals for multiple wavelengths further complicates the use of homodyne PSK in prior-art WDM systems.

SUMMARY OF THE INVENTION

Problems in the prior art are addressed, in accordance with the principles of the invention, by a WDM communication system having two optical-frequency comb sources (OFCSs) that are substantially phase-locked to one another, with one of these OFCSs used at a transmitter to produce a WDM communication signal and the other OFCS used at a receiver to produce multiple local-oscillator signals suitable for homodyne detection of the WDM communication signal received from the transmitter. An OFCS is an optical source adapted to generate a plurality of frequency components, also referred to as comb lines, having a well-defined phase relationship with one another. One example of an OFCS is a pulsed mode-locked laser. The receiver is adapted to use a subset of the WDM signal components, referred to as beacons, to establish the substantial phase-lock between the receiver's and transmitter's OFCSs.

Advantageously, having, at a transmitter and a receiver, two OFCSs that are phase-locked to one another enables the use of PSK modulation and homodyne detection while employing relatively simple phase-lock circuitry. For example, a phase-lock loop that locks the phases of the comb lines generated by the receiver's OFCS to the respective beacon lines of the received WDM signal also produces a substantial phase lock between one or more additional comb lines of the receiver's OFCS and the respective one or more non-beacon components of the WDM signal. As a result, these non-beacon components of the WDM signal can be processed at the receiver using homodyne detection without employing any additional phase-lock loops.

In one embodiment, the transmitter has (i) a first OFCS adapted to generate a first frequency comb and (ii) an optical modulator adapted to use the first frequency comb to generate a WDM communication signal for transmission to the receiver, this WDM signal having at least two beacon lines. The receiver has a second OFCS adapted to produce a second frequency comb such that the second frequency comb has at least two comb lines having the beacon-line frequencies, the phases of which comb lines are locked to the phases of the beacon lines of the received WDM signal.

BRIEF DESCRIPTION OF THE DRAWINGS

FIG. 5 shows the layout of an optical modulator that can be used in the system of FIG. 1 according to one embodiment of the invention;

FIG. 6 shows the layout of a multi-channel homodyne detector that can be used in the system of FIG. 1 according to one embodiment of the invention;

DETAILED DESCRIPTION

Figure 1:
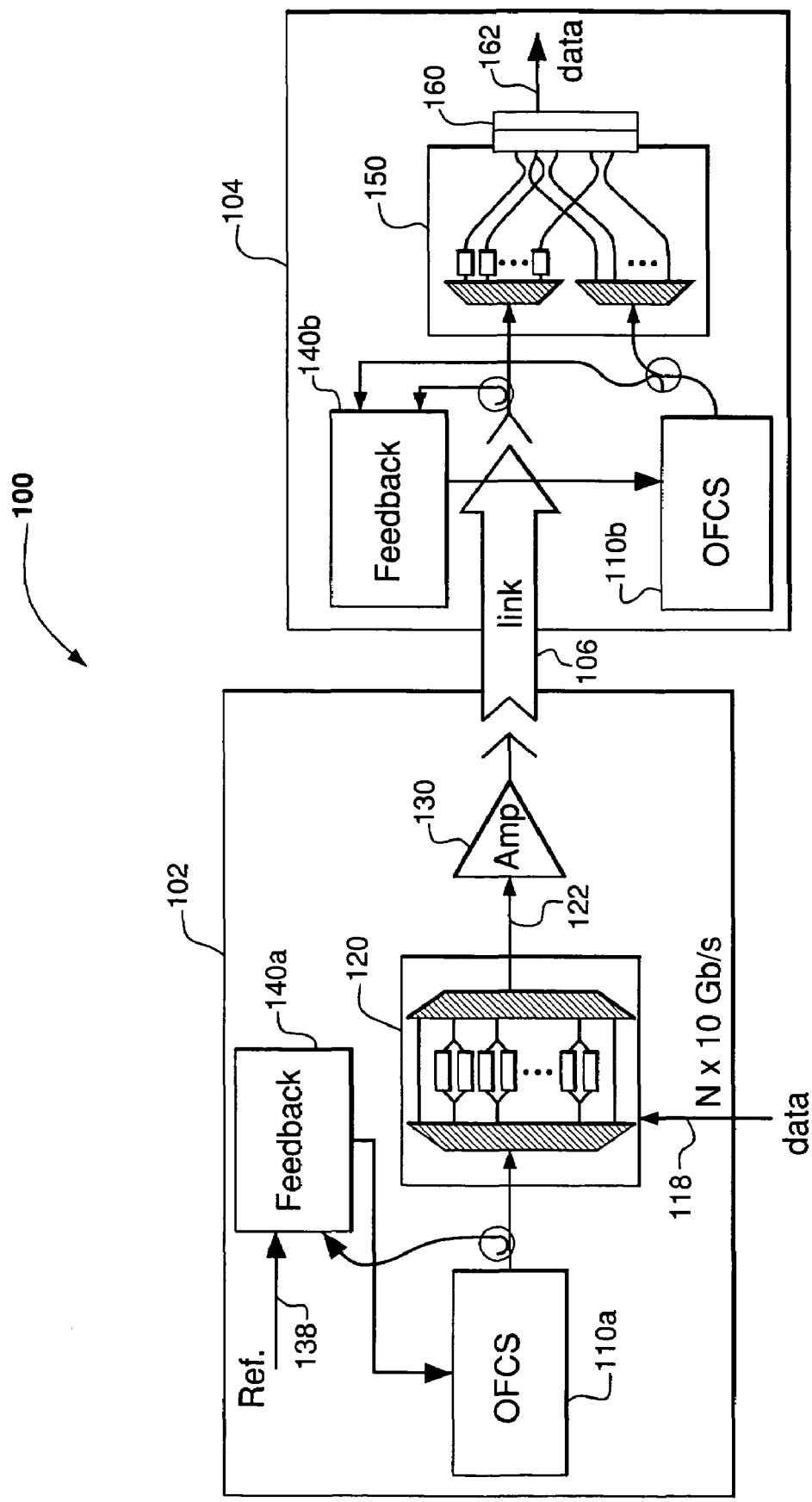
FIG. 1 shows a block diagram of a WDM communication system according to one embodiment of the invention.
Figure 2:
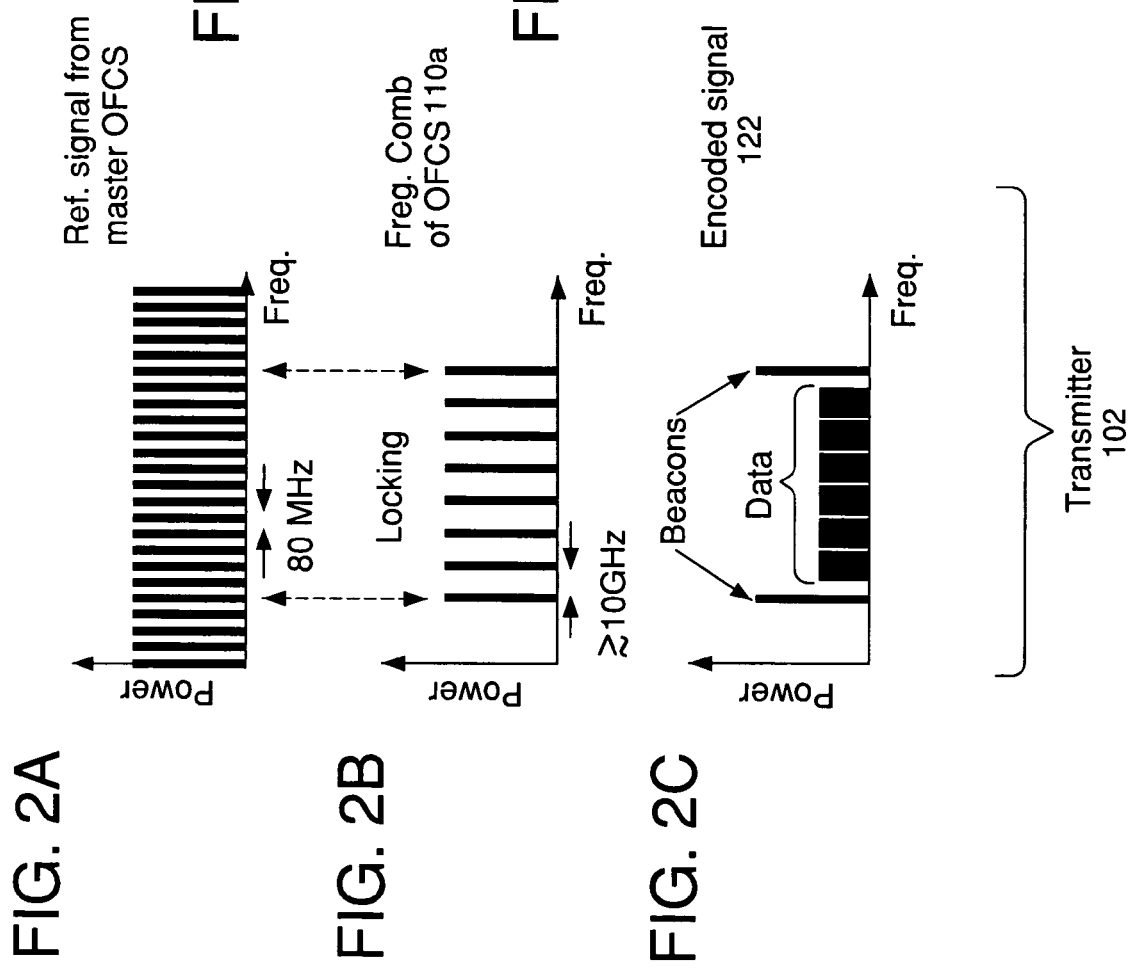
FIGS. 2A-E graphically illustrate a representative configuration of the system shown in FIG. 1.

FIG. 1 shows a WDM communication system 100 according to one embodiment of the invention. System 100 has a WDM transmitter 102 and a WDM receiver 104 coupled via an optical communication link 106. Transmitter 102 has an optical-frequency comb source (OFCS) 110a that is adapted to generate a plurality of frequency (wavelength) components. In one configuration, the frequency components can be substantially uniformly spaced. In another configuration, some of the frequency components can be suppressed or filtered out to create a plurality of non-uniformly spaced frequency components. Hereafter, a plurality of frequency components generated by an OFCS analogous to OFCS 110a is referred to as a "frequency comb" and each individual frequency component of a frequency comb is referred to as a "comb line."

An optical modulator 120 coupled to OFCS 110a is configured to modulate some or all of the comb lines generated by that OFCS with data that are provided by a data stream 118. Modulator 120 is further configured to multiplex the modulated and non-modulated (if any) comb lines to form a WDM signal 122. WDM signal 122 is amplified using an optical amplifier 130, and the resulting amplified WDM signal is applied to optical communication link 106 for transmission to receiver 104.

Receiver 104 receives the transmitted WDM signal and applies that signal to a multi-channel homodyne detector 150. A local oscillator signal for detector 150 is provided by an OFCS 110b that is analogous to OFCS 110a of transmitter 102. For each modulated component of the received WDM signal, detector 150 determines that component's phase in each time slot (bit interval) and provides the determination results to a signal processor 160. Signal processor 160 then converts these results into a data stream 162 corresponding to data stream 118.

A phase-lock of the LO signal produced by OFCS 110b to the received WDM signal is achieved using a feedback circuit 140b. The comb lines of signal 122 and the corresponding comb lines of the signal received at receiver 104, which comb lines are used by the receiver to establish a phase-lock between the WDM and LO signals, are hereafter referred to as beacons. As will become apparent from the description below, a beacon can be a non-modulated comb line, in which case it is referred to as a CW beacon. Alternatively, a beacon can be a modulated comb line, in which case it is referred to as a modulated beacon.

In one embodiment, each of OFCSs 110a-b comprises a mode-locked laser whose cavity modes manifest themselves as comb lines of the respective frequency comb. In addition, OFCSs 110a-b are configured such that their respective frequency combs have a common set of frequencies that includes the frequencies corresponding to the beacons. Feedback circuit 140b is designed to phase-lock the comb lines of OFCS 110b having the beacon frequencies to the beacon lines of the received WDM signal. Because all modes of a mode-locked laser are phase-locked to each other, all comb lines of OFCSs 110b become phase-locked to the corresponding frequency components of the received WDM signal when feedback circuit 140b has phase-locked the comb-lines of OFCS 110b having the beacon frequencies to the beacon lines of that WDM signal. The latter characteristic enables OFCS 110b to provide appropriate LO signals to multi-channel homodyne detector 150 for proper phase detection of all modulated components of the received WDM signal.

The phase-lock of OFCS 110b to the received WDM signal substantially phase-locks that OFCS to OFCS 110a. While OFCS 110a-b are phase-locked to each other, they can still be affected by a relatively slow frequency drift, albeit a synchronous one. To substantially avoid this frequency drift, OFCS 110a can optionally be phase-locked to a frequency-stabilized reference signal 138. This phase-lock can be achieved, e.g., using a feedback circuit 140a that is substantially similar to feedback circuit 140b. In one configuration, reference signal 138 can be provided by a master OFCS (not shown) that is referenced to a frequency standard, e.g., an atomic clock. A more detailed description of a suitable master OFCS and its referencing to a frequency standard can be found in the above-referenced commonly owned patent application entitled "Cloning Optical-Frequency Comb Sources."

FIGS. 2A-E graphically illustrate one representative configuration of system 100, in which CW beacons are used. More specifically, FIGS. 2A-C graphically show certain optical signals at transmitter 102, and FIGS. 2D-E graphically show certain optical signals at receiver 104.

FIG. 2A shows reference signal 138 received, e.g., from a master OFCS. Signal 138 can have a relatively broad (e.g., octave-spanning) spectrum and includes relatively closely spaced comb lines (illustratively shown as having a spectral separation of 80 MHz). FIG. 2B shows a frequency comb generated by OFCS 110a. This frequency comb can have a relatively narrow spectral span and includes relatively widely spaced comb lines (illustratively shown as having a spectral separation of greater than about 10 GHz). The vertical double-headed arrows drawn between FIGS. 2A and 2B symbolically represent the phase-lock between the respective selected comb lines of signal 138 and the frequency comb of OFCS 110a, obtained using feedback circuit 140a. FIG. 2C shows WDM signal 122. Note that the data modulation imparted by modulator 120 produces spectral broadening of the corresponding comb lines. The CW beacons are illustratively shown as being the two peripheral lines in the spectrum of OFCS 110a. In a different configuration, any other two comb lines can be selected to serve as beacons.

FIG. 2D shows a WDM signal received from communication link 106 at receiver 104. The diminished intensity of the received WDM signal compared to the WDM signal shown in FIG. 2C graphically indicates the signal attenuation imparted by communication link 106. FIG. 2E shows a frequency comb generated by OFCS 110b. This frequency comb is similar to the frequency comb shown in FIG. 2B. The vertical double-headed arrows drawn between FIGS. 2D and 2E represent the phase-lock between the beacon lines of the received WDM signal and the corresponding comb lines of OFCS 110b, obtained using feedback circuit 140b.

Figure 3:
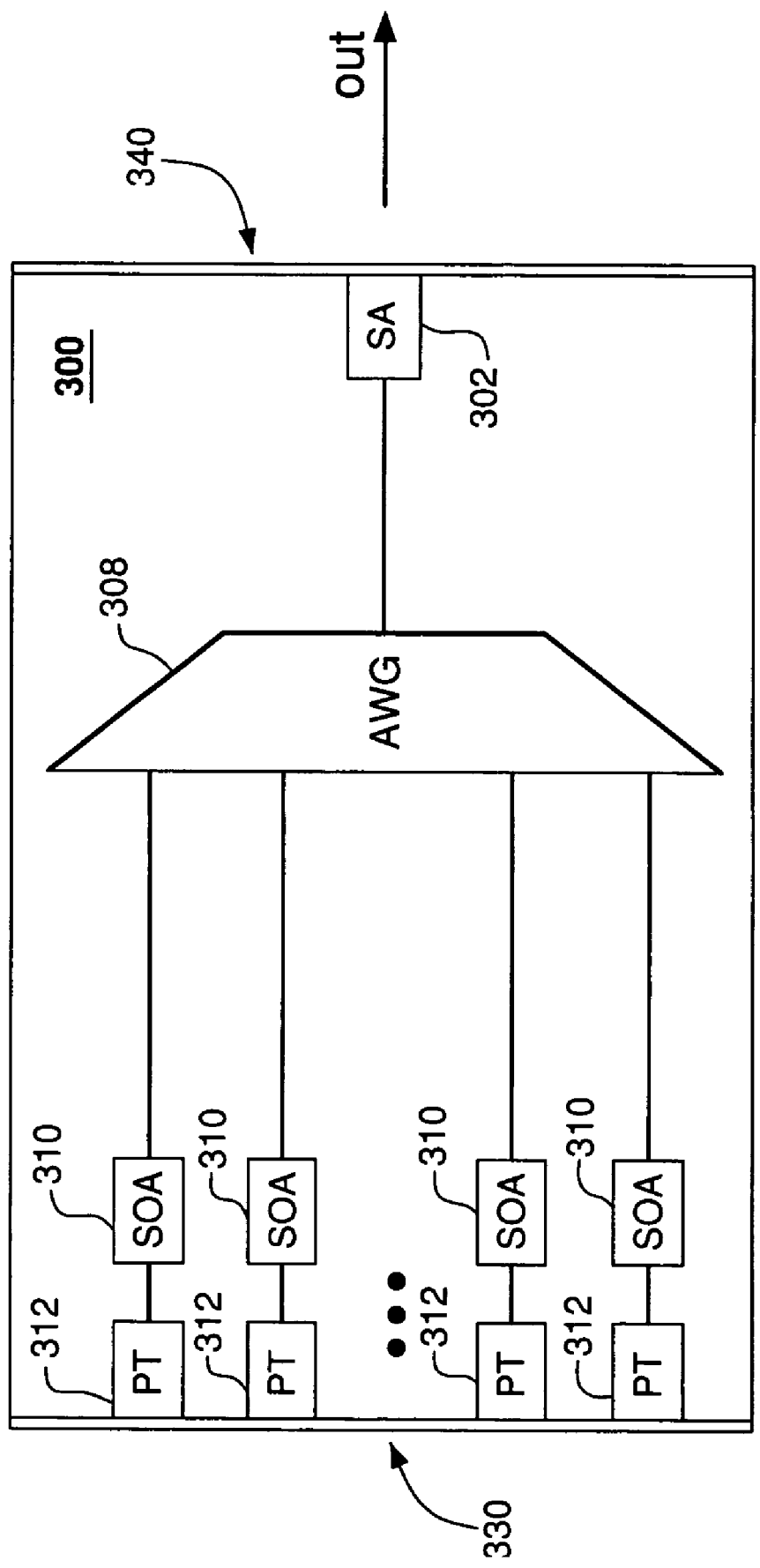
FIG. 3 shows the layout of a mode-locked laser that can be used as an optical-frequency comb source (OFCS) in the system of FIG. 1 according to one embodiment of the invention.

FIG. 3 shows the layout of a mode-locked laser 300 that can be used as OFCS 110 in system 100 according to one embodiment of the invention. Laser 300 has an optical cavity defined by a highly reflective mirror 330 and a partially transparent mirror 340. The optical cavity has an arrayed waveguide grating (AWG) 308 having a plurality of overlapping optical passbands. For each passband, the optical cavity has a dedicated semiconductor optical amplifier (SOA) 310 serially connected with a dedicated phase tuner (PT) 312. Each SOA 310 is adapted to provide optical gain for the respective optical passband, and the respective phase tuner 312 is adapted to substantially provide dispersion compensation within that optical passband. The optical cavity also has a saturable absorber (SA) 302 adapted to modulate optical losses in the cavity such that the optical gains provided by SOAs 310 and the loss modulation provided by SA 302 create conditions for an optical pulse train to be emitted from the cavity through partially transparent mirror 340. Spectral characteristics of the frequency comb corresponding to the pulse train can be controlled, e.g., by appropriately configuring phase tuners 312. In one implementation, laser 300 is an integrated waveguide circuit. A more detailed description of laser 300 can be found in commonly owned U.S. patent application Ser. No. 11/296,996, filed on Dec. 8, 2005, identified by attorney docket reference "Doerr 106," and entitled "Wide-Bandwidth Mode-Locked Laser," the teachings of which are incorporated herein by reference.

Figure 4:
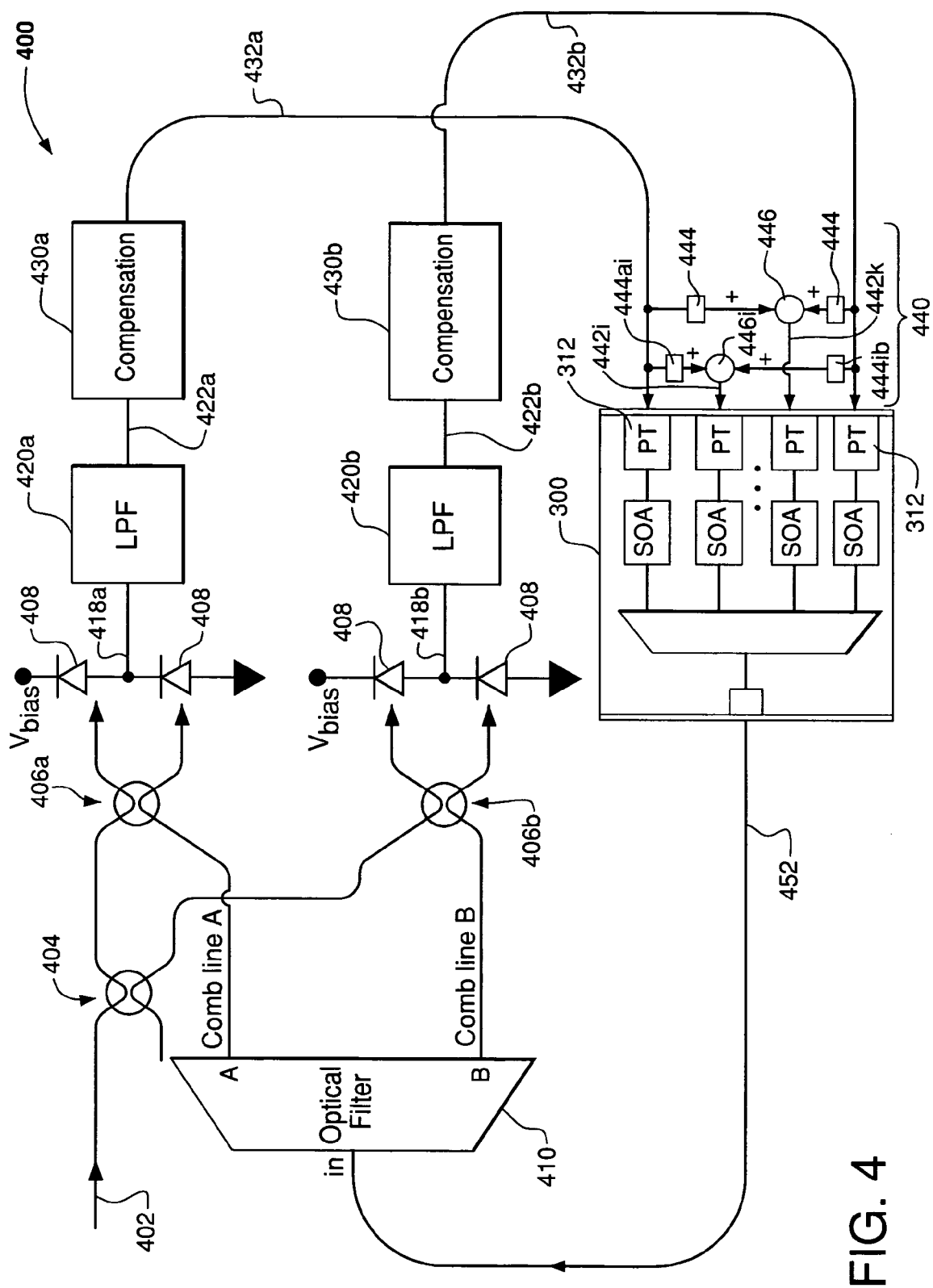
FIG. 4 shows a schematic block diagram of a feedback circuit that can be used in the system of FIG. 1 according to one embodiment of the invention.

FIG. 4 shows a schematic block diagram of a feedback circuit 400 that can be used as feedback circuit 140 in system 100 according to one embodiment of the invention. In FIG. 4, feedback circuit 400 is illustratively shown as coupled to laser 300 of FIG. 3. A reference signal 402 applied to feedback circuit 400 can either be a signal analogous to reference signal 138 (see FIGS. 1 and 2A) or a signal analogous to a WDM signal having beacon lines (see FIGS. 1 and 2D).

An optical output signal 452 of laser 300 is applied to an optical filter 410 that blocks all comb lines of signal 452, except for the two comb lines designated in FIG. 4 as comb lines A and B, respectively, and separates out those two comb lines. When feedback circuit 400 is configured as feedback circuit 140a (FIG. 1), comb lines A and B can be any two suitable comb lines corresponding to the comb lines of reference signal 138. Alternatively, when feedback circuit 400 is configured as feedback circuit 140b (FIG. 1), comb lines A and B have respective frequencies corresponding to those of the beacon lines of the received WDM signal (see, e.g., FIGS. 2C-D). After passing through optical filter 410, comb lines A and B appear at ports A and B, respectively, of the filter.

Reference signal 402 is split into two attenuated copies using an optical coupler 404. The first attenuated copy of signal 402 and comb line A from port A of optical filter 410 are applied to an optical coupler 406a. Similarly, the second attenuated copy of signal 402 and comb line B from port B of optical filter 510 are applied to an optical coupler 406b.

Each of optical couplers 406a-b is designed to produce two interference signals from the respective attenuated copy of signal 402 and the respective one of comb lines A and B. Each interference signal is then directed to a respective one of photodetectors 408, where that signal is converted into a corresponding electrical signal. Photodetectors 408 in circuit 400 are arranged in two pairs, with the two photodetectors of each pair serially connected to one another as indicated in FIG. 4. A signal 418 generated by each photodetector pair is substantially a difference signal between the electrical signals produced by the respective photodetectors. Each signal 418 is applied to a respective low-pass filter (LPF) 420 to produce a respective filtered signal 422. Each filtered signal 422 is then fed into a respective compensation circuit 430, which, based on that signal, produces a respective control signal 432 applied to laser 300.

In case of a frequency mismatch between comb line A and a corresponding comb line of signal 402, signal 418a has a beat frequency corresponding to the frequency difference between the comb lines. Since LPF 420a is adapted to block this beat frequency, signal 422a is substantially zero. On the other hand, if the frequency of comb line A substantially matches the frequency of the corresponding comb line of signal 402, then signal 418a has a DC component proportional to $\sin\phi$, where $\phi$ is a phase shift between these comb lines. LPF 420a passes this DC component through to produce filtered signal 422a. Compensation circuit 430a is designed to produce control signal 432a such as to substantially drive signal 422a to zero. Since the zero of signal 422a corresponds to $\phi=0$, laser 300 is driven by circuit 430a to have its comb line A phase-locked to the corresponding comb line of signal 402.

Similarly, in case of a frequency mismatch between comb line B and a corresponding comb line of signal 402, signal 418b has a beat frequency corresponding to the frequency difference between the comb lines, which beat frequency is blocked by LPF 420b. On the other hand, if the frequency of comb line B substantially matches the frequency of the corresponding comb line of signal 402, then signal 418b has a DC component that passes through LPF 420b to form signal 422b. Compensation circuit 430b then produces control signal 432b such as to minimize the magnitude of signal 422b, thereby driving laser 300 to have its comb line B phase-locked to the corresponding comb line of signal 402.

Note that, in laser 300, signal 432a is applied to the phase tuner 312 corresponding to the spectral passband having comb line A. Similarly, signal 432b is applied to the phase tuner 312 corresponding to the spectral passband having comb line B. Controls signals 442 (only two of which are illustratively shown in FIG. 4) that are applied to other phase tuners 312 of laser 300 are generated by a control circuit 440 based on control signals 432a-b. More specifically, each control signal 442 is a combination of signals 432a-b taken with appropriate weights. For example, control signal 442-i applied to an i-th phase tuner 312 is produced using Eqs. (1A-C) as follows:

$$S_{442i} = w_{ai}S_{432a} + w_{bi}S_{432b} \quad (1A)$$

$$w_{ai} = \frac{F_i - F_B}{F_A - F_B} \quad (1B)$$

$$w_{bi} = \frac{F_A - F_i}{F_A - F_B} \quad (1C)$$

where $S_{442i}$, $S_{432a}$, and $S_{432b}$ are the magnitudes of signals 442-i, 432a, and 432b, respectively; $w_{ai}$ and $w_{bi}$ are the weighting coefficients; $F_A$, $F_B$, and $F_i$ are the center frequencies of the spectral passbands corresponding to the phase tuner 312 receiving signal 432a, the phase tuner 312 receiving signal 432b, and the i-th phase tuner 312, respectively.

Control circuit 440 includes a plurality of weighting blocks 444 and a plurality of summation nodes 446 that implement Eqs. (1A-C). For example, weighting block 444ai multiplies signal 432a by a factor of $w_{ai}$. Similarly, weighting block 444bi multiplies signal 432b by a factor of $W_{bi}$. The resulting weighted signals are then summed in summation node 446i to produce signal 442-i.

When beacons are data modulated, it might become advantageous to use feedback circuits/arrangements that employ a different principle of phase-locking than circuit 400 (FIG. 4). Examples of such suitable phase-locking arrangements are, but are not limited to: (1) a pilot carrier synchronization arrangement disclosed, e.g., in an article by J. M. Kahn, entitled "1 Gbit/s PSK Homodyne Transmission System Using Phase-Locked Semiconductor Lasers," Photonics Technology Letters, IEEE Volume 1, Issue 10, Oct. 1989, pages 340-342; (2) a Costas-type phase-lock loop disclosed, e.g., in an article by W. R. Leeb, entitled "Optical 90° C. Hybrid Costas-Type Receivers," Electronics Letters, Volume 26, Issue 18, 30 Aug. 1990, pages 1431-1432; (3) a synchronization-bit arrangement disclosed, e.g., in an article by B. Wandemoth, entitled "20 Photon/Bit 565 Mbit/s PSK Homodyne Receiver Using Synchronization Bits," Electronics Letters, Volume 28, Issue 4, 13 Feb. 1992, pages 387-388; and/or (4) a phase-locking arrangement designed to maximize baseband signal power disclosed, e.g., in an article by K. H. Kudielka and W. Klaus, entitled "Optical Homodyne PSK Receiver: Phase Synchronization by Maximizing Baseband Signal Power," Lasers and Electro-Optics Society 1999, 12th Annual Meeting (LEOS '99) IEEE, Volume 1, 8-11 Nov. 1999, pages 295-296. These four articles are incorporated herein by reference in their entirety.

FIG. 5 shows the layout of an optical modulator 500 that can be used as optical modulator 120 in system 100 according to one embodiment of the invention. Modulator 500 has a de-multiplexer 510 that is configured to de-multiplex an optical input signal 502 having a frequency comb into individual comb lines 512. The two comb lines labeled 512a and 512b are not modulated with data in modulator 500 and can serve as beacons in the transmitted WDM signal (see also FIG. 2C). Each of the other comb lines 512 is applied to a respective Mach-Zehnder modulator (MZM) 516 that is driven in a push-pull configuration using a respective data stream of the N data streams applied to modulator 500. An output signal produced by each MZM 516 is a respective PSK-modulated signal 518 that carries the data from the corresponding data stream. A multiplexer 520 multiplexes comb lines 512a-b and PSK-modulated signals 518 to form a WDM signal 522 that can be used, e.g., as signal 122 in system 100.

FIG. 6 shows the layout of a multi-channel homodyne detector 600 that can be used as homodyne detector 150 in system 100 according to one embodiment of the invention. Detector 600 is configured to receive two optical input signals 602 and 604, e.g., a WDM signal received via communication link 106 and a local-oscillator signal produced by OFCS 110b, respectively (see FIG. 1). Input signals 602 and 604 are applied to de-multiplexers 612 and 614, respectively, each configured to separate the respective input signal into individual frequency components (see also FIGS. 2D-E). Two respective separated components having the same frequency are directed from de-multiplexers 612 and 614 to a respective optical coupler 620. Each optical coupler 620 is configured to (i) combine the received components to produce two respective interference signals and (ii) apply these interference signals to a respective pair of photodetectors 632 of a photodetector array 630. A pair of photodetectors 632 corresponding to one optical coupler 620 is generally analogous to a serially connected pair of photodetectors 408 of circuit 400 (see FIG. 4). As a result, each such photodetector pair in array 630 produces a signal that is indicative of a phase difference between the respective components of signals 602 and 604. Detector 600 then outputs the signals generated by array 630 to a signal processor, e.g., similar to signal processor 160 of FIG. 1, for further processing. This processing decodes these signals and recovers the data carried by the modulated components of input signal 602.

In one embodiment, detector 600 optionally incorporates phase shifters 618 coupled between de-multiplexer 612 and optical couplers 620. Phase shifters 618 are adapted to correct (quasi) static phase differences between the comb lines of signal 602 and the respective comb lines of signal 604. Such (quasi) static phase differences could possibly result from differences in pulse chirp, differences in chromatic dispersion in the respective optical paths, etc.

Figure 7:
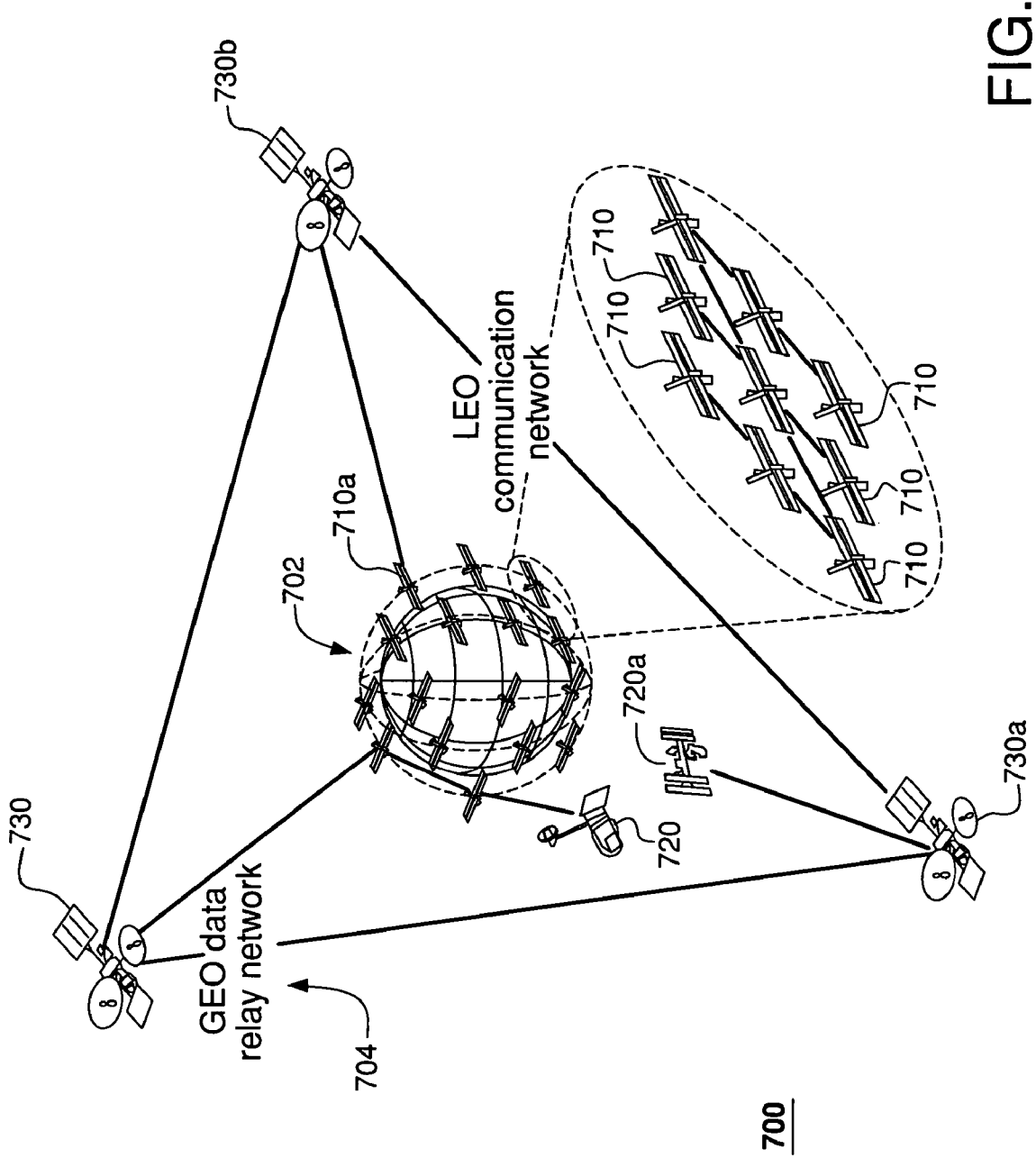
FIG. 7 shows a diagram of a WDM communication system according to another embodiment of the invention.

FIG. 7 shows a WDM communication system 700 according to another embodiment of the invention. More specifically, system 700 is an extraterrestrial communication system having a plurality of satellites orbiting the Earth. In a representative configuration, system 700 includes a constellation 702 of satellites 710 in low Earth orbit (LEO). In general, constellation 702 has a sufficient number of satellites 710 for full Earth coverage. Commercial systems IRIDIUM, TELEDESIC, and CELESTRI are representative examples of constellation 702.

System 700 further includes a constellation 704 of satellites 730 in geosynchronous orbit (GEO). Satellites 730 are primarily configured to function as data relay stations, with constellation 704 serving as a data relay network. NASA's TDRSS network is a representative example of constellation 704.

System 700 may further include a plurality of specialized spacecraft 720, such as the Space Shuttle, the International Space Station, military surveillance satellites, etc. Spacecraft 720 typically generate relatively large amounts of data, e.g., high resolution images, video streams, telemetry, and the like, that are relayed via constellations 702 and 704 to the respective terrestrial stations (not shown). Likewise, the terrestrial stations often transmit relatively large amounts of data via constellations 702 and 704 to spacecraft 720 and/or other terrestrial stations. For example, spacecraft 720a might have data intended for a terrestrial station located in Asia. Using system 700, spacecraft 720a then transmits the data to GEO satellite 730a, which then relays the data to GEO satellite 730b, which further relays the data to LEO satellite 710a, which finally relays the data to the terrestrial station in Asia. One skilled in the art will appreciate that various data relay paths can similarly be realized between various communication nodes of system 700.

Figure 8:
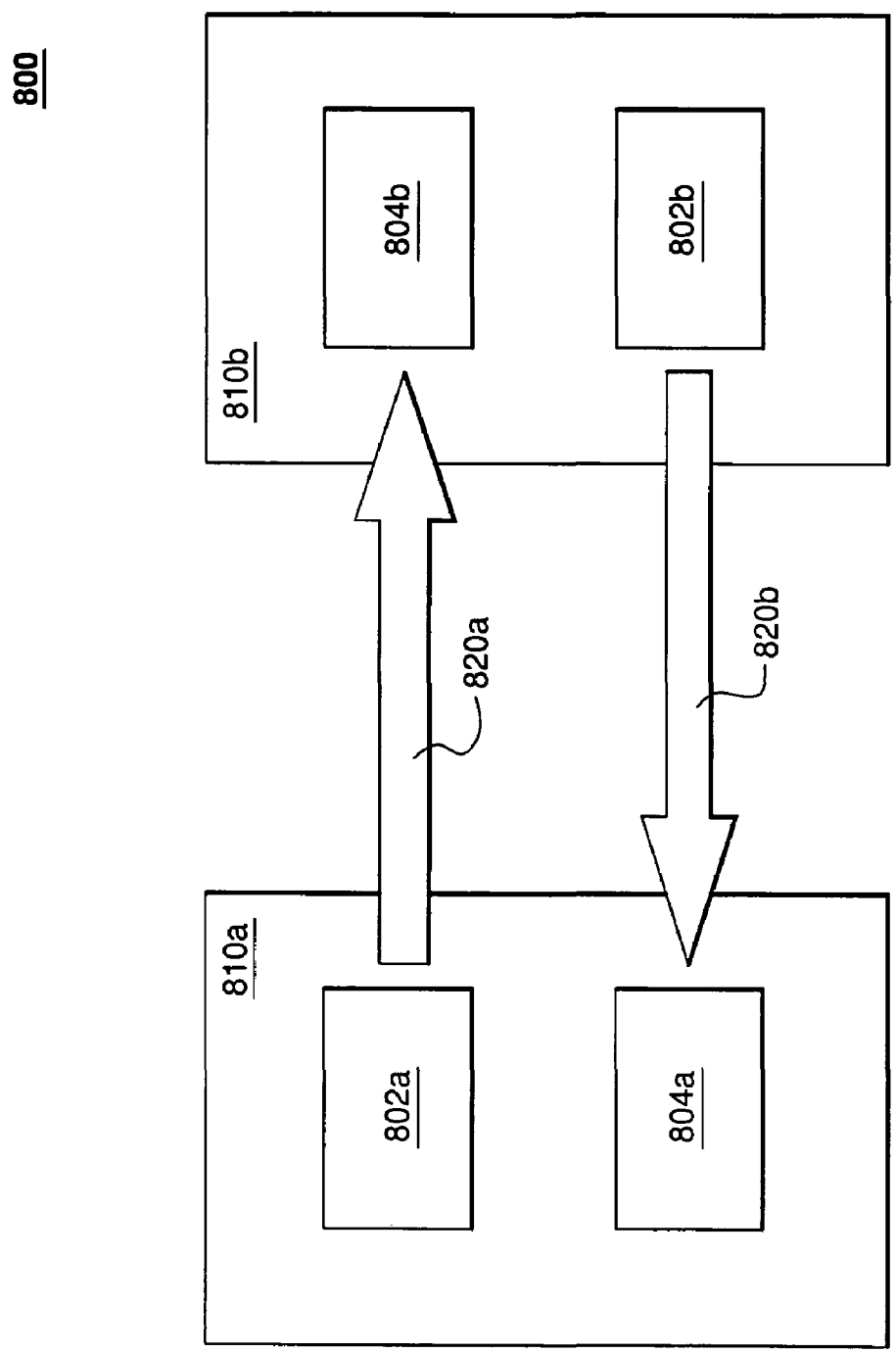
FIG. 8 shows a block diagram of a data relay arrangement (DRA) that can be used in the system of FIG. 7 according to one embodiment of the invention.

FIG. 8 shows a block diagram of a data relay arrangement (DRA) 800 that can be used in system 700 according to one embodiment of the invention. DRA 800 has two transceivers 810a-b coupled via a bidirectional optical communication link 820. Each transceiver 810 has a transmitter 802 and a receiver 804. Transmitter 802a of transceiver 810a is coupled to receiver 804b of transceiver 810b via communication sub-link 820a. Similarly, transmitter 802b of transceiver 810b is coupled to receiver 804a of transceiver 810a via communication sub-link 820b. Transceivers 810a-b can, for example, be located onboard spacecraft 720a and GEO satellite 730a, respectively, of system 700.

In one embodiment, each transmitter 802 is substantially similar to transmitter 102, and each receiver 804 is substantially similar to receiver 104 (see FIG. 1). As a result, transceivers 810a-b can exchange data using optical WDM signals, PSK modulation, and homodyne detection substantially as described above in the context of FIGS. 1 and 2. Note however that, when transmitters 802a-b are configured to use frequency combs having substantially the same frequencies, e.g., by referencing to a master OFCS, the relative motion of transceivers 810a-b imparts Doppler shifts on the transmitted WDM signals and results, e.g., in a different set of frequencies at transmitter 802a compared to that at receiver 804a. Furthermore, since the Doppler shifts depend on the relative velocity, each receiver 804 will typically "see" different sets of frequencies in the WDM signals received from the transmitters 802 located onboard different satellites.

Figure 9:
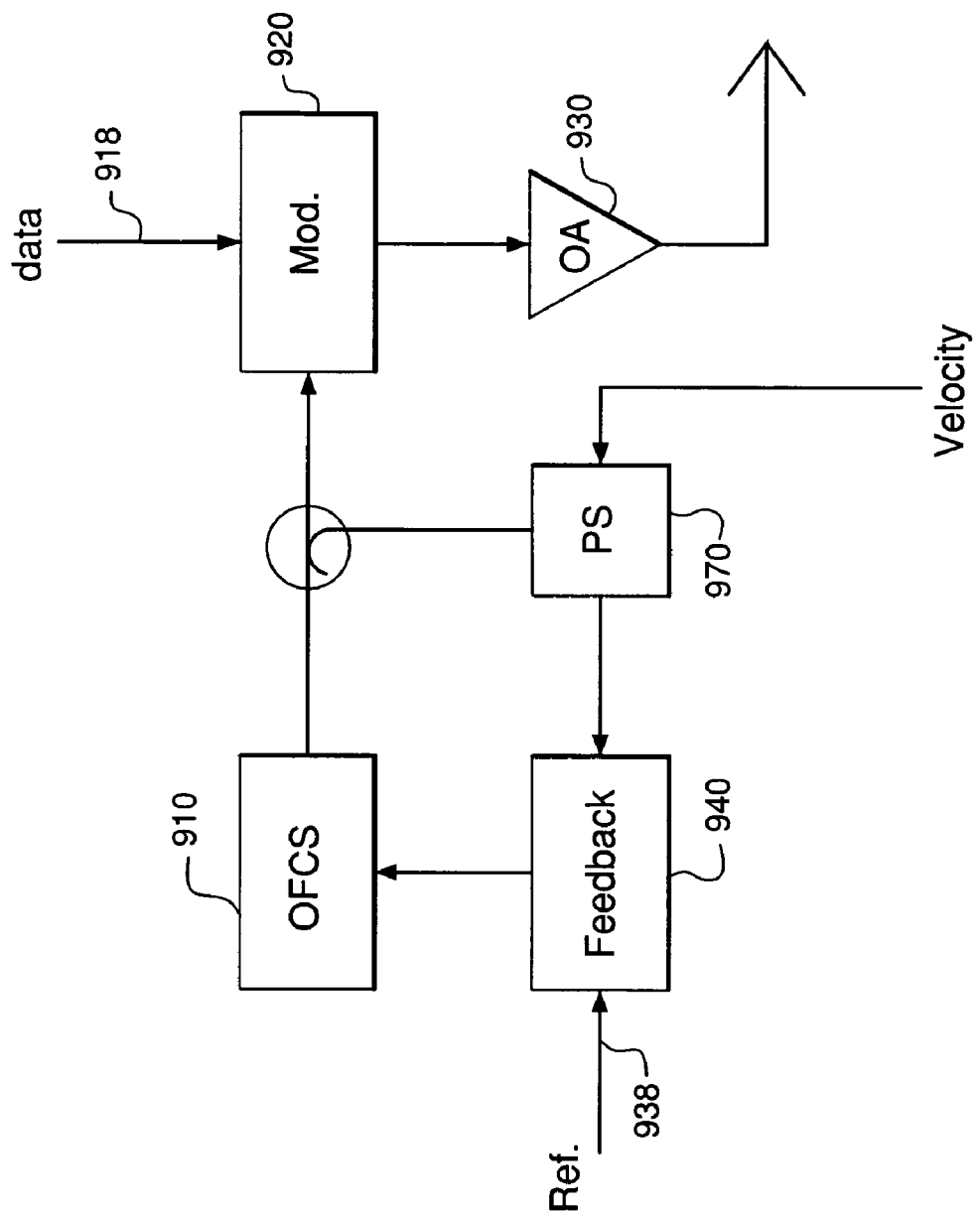
FIG. 9 shows a schematic block diagram of a transmitter that can be used in the DRA of FIG. 8 according to another embodiment of the invention.

FIG. 9 shows a block diagram of a transmitter 902 that can be used as transmitter 802 in DRA 800 according to another embodiment of the invention. Transmitter 902 is analogous to transmitter 102 of FIG. 1, with the analogous elements of these two transmitters designated with reference labels having the same last two digits. However, one difference between transmitter 102 and transmitter 902 is that the latter has an additional element, i.e., a phase shifter (PS) 970, incorporated into the feedback loop between OFCS 910 and feedback circuit 940. PS 970 enables transmitter 902 to provide Doppler-shift pre-compensation. More specifically, based on the relative velocity of the two communicating transceivers, transmitter 902 adjusts the frequency comb generated by OFCS 910 such as to substantially cancel the effect of Doppler shifts at the receiver. If each transmitter in system 700 has a similar Doppler-shift pre-compensation, each receiver in the system will advantageously "see" substantially the same set of frequencies in the WDM signals received from different satellites.

The Doppler shift changes each frequency in a frequency comb from f to αf, where α is a coefficient that depends on the relative velocity of the transmitter and the receiver. Accordingly, PS 970 imparts a frequency-dependent phase shift to transform frequency f into frequency αf to emulate the Doppler shift. Feedback circuit 940 then causes OFCS 910 to scale the frequencies of its frequency comb with respect to the frequencies of reference signal 938 by a factor of 1/α. The net effect of the Doppler shift and the frequency scaling in transmitter 902 is that the frequencies of the WDM signal at the receiver will have substantially the same frequencies as reference signal 938.

If OFCS 910 is implemented using a mode-locked laser similar to laser 300 (FIG. 3), then its frequency comb has comb lines at frequencies $mc/(2n_pL)$, where m is an integer, c is the speed of light, L is the cavity length, and np is the refractive index. Changing L (e.g., using a piezoelectric actuator) will thus track the Doppler shifts for all frequencies simultaneously. For example, a cavity length change of $\lambda\Delta f/(2n_pf_r)$ will substantially compensate a Doppler shift of $\Delta f$ at wavelength $\lambda$ in a mode-locked laser having a round-trip frequency of $f_r$. If $f_r=10$ GHz, $\Delta f=5$ GHz, $n_p=3.3$, and $\lambda=1.55$ μm, then the cavity length change is about 0.1 μm.

While this invention has been described with reference to illustrative embodiments, this description is not intended to be construed in a limiting sense. Although embodiments of the invention were described in reference to the use of two comb lines for obtaining a phase-lock, more than two comb lines can also be used to obtain such phase-lock. If a slow frequency drift can be tolerated in the communication system, then the atomic-clock referencing of the master OFCS can be omitted. Although embodiments of the invention were described in reference to PSK modulation, the invention can also be practiced with other types of modulation, e.g., on/off keying, amplitude-shift keying, and multi-level phase or amplitude modulation schemes. In general, transmitters and receivers of the invention are configured to operate with optical signals having intensities that are above the quantum limit. For example, for binary homodyne PSK and bit-error rate (BER) of $10^{-9}$, the quantum limit is 9 photons per bit. In general, the term "optical" as used in this specification refers to the use of any suitable electro-magnetic radiation, and not necessarily that corresponding to visible or infrared spectral regions. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A communication method, comprising:
    receiving a WDM communication signal having first and second beacon lines from a first frequency comb produced using a first optical-frequency comb source (OFCS);
    generating a second frequency comb using a second OFCS;
    locking the phase of a first comb line of the second frequency comb to the phase of the first beacon line; and
    locking the phase of a second comb line of the second frequency comb to the phase of the second beacon line to substantially achieve a phase-lock between the first and second frequency combs.

2. The method of claim 1, wherein at least one of the first and second beacon lines is modulated with data.

3. The method of claim 1, wherein:
    the first OFCS is located at a transmitter; and
    the second OFCS is located at a receiver.

4. The method of claim 1, wherein each of the first and second OFCSs is a mode-locked laser.

5. The method of claim 1, wherein the first OFCS is phase-locked to a master OFCS.

6. The method of claim 1, further comprising the steps of:
    optically filtering the second frequency comb to select the first and second comb lines;
    mixing said first comb line with a first copy of the received WDM signal to produce a first pair of interference signals;
    mixing said second comb line with a second copy of the received WDM signal to produce a second pair of interference signals;
    converting the first pair of said interference signals into a first electrical signal indicative of a phase difference between the first comb line and the first beacon line;
    converting the second pair of said interference signals into a second electrical signal indicative of a phase difference between the second comb line and the second beacon line; and
    based on the first and second electrical signals, generating one or more control signals that are applied to the second OFCS to produce (i) the locking of the phase of the first comb line to the phase of the first beacon line and (ii) the locking of the phase of the second comb line to the phase of the second beacon line.

7. The method of claim 6, further comprising the steps of:
    generating a first control signal based on the first electrical signal;
    generating a second control signal based on the second electrical signal;
    weighting the first control signal to generate a first weighted signal;
    weighting the second control signal to generate a second weighted signal; and
    adding the first and second weighted signals to generate a third control signal.

8. The method of claim 7, comprising repeating the steps of weighting and adding using different weighting coefficients to produce at least one additional control signal.

9. The method of claim 1, wherein:
    the first OFCS is moving with respect to the second OFCS; and
    the method comprises the steps of:

for each comb line of the first frequency comb, changing the frequency of the comb line from a respective initial frequency to a respective adjusted frequency to introduce a frequency shift having an absolute value that is substantially equal to a Doppler shift of the adjusted frequency due to the motion.

10. The method of claim 9, wherein the first OFCS is a mode-locked laser having an optical cavity and the method comprises the step of changing the length of said optical cavity.

11. The method of claim 1, wherein:
the first beacon line is a first non-modulated component of the received WDM signal;
the second beacon line is a second non-modulated component of the received WDM signal; and
the received WDM signal comprises one or more data-modulated components representing the first frequency comb.

12. The method of claim 11, further comprising the step of:
decoding the received WDM signal using homodyne detection, wherein one or more comb lines of the second frequency comb corresponding to the modulated components of the received WDM signal are used as one or more local oscillator signals for said homodyne detection.

13. The method of claim 11, wherein the method further comprises the steps of:
generating the first frequency comb;
de-multiplexing the first frequency comb into individual comb lines;
individually modulating each of selected one or more comb lines of the first frequency comb with a respective portion of the data;
multiplexing the one or more modulated comb lines to form a multiplexed signal; and
transmitting the multiplexed signal via a communication link to produce the received WDM signal.

14. Apparatus, comprising:
means for receiving a WDM communication signal having first and second beacon lines representing a first frequency comb;
means for generating a second frequency comb; and
means for locking the phases of the second frequency comb to the phases of the first frequency comb, wherein said means for locking is adapted to (i) lock the phase of a first comb line of the second frequency comb to the phase of the first beacon line and (ii) lock the phase of a second comb line of the second frequency comb to the phase of the second beacon line to substantially achieve a phase-lock between the first and second frequency combs.

15. Apparatus, comprising:
a detector adapted to receive a WDM communication signal having first and second beacon lines representing a first frequency comb generated by a first optical-frequency comb source (OFCS);
a second OFCS adapted to generate a second frequency comb; and
a control circuit adapted to control the second OFCS such that (i) the phase of a first comb line of the second frequency comb is substantially locked to the phase of the first beacon line and (ii) the phase of a second comb line of the second frequency comb is substantially locked to the phase of the second beacon line.

16. The apparatus of claim 15, wherein at least one of the first and second beacon lines is modulated with data.

17. The apparatus of claim 15, wherein:
the apparatus is located at a receiver; and
the first OFCS is located at a transmitter.

18. The apparatus of claim 15, wherein each of the first and second OFCSs is a mode-locked laser.

19. The apparatus of claim 15, wherein the control circuit comprises:
an optical filter adapted to filter the second frequency comb to select the first and second comb lines;
a first optical coupler adapted to mix said first comb line with a first copy of the received WDM signal to produce a first pair of interference signals;
a second optical coupler adapted to mix said second comb line with a second copy of the received WDM signal to produce a second pair of interference signals;
a first photodetector adapted to convert the first pair of said interference signals into a first electrical signal indicative of a phase difference between the first comb line and the first beacon line;
a second photodetector adapted to convert the second pair of said interference signals into a second electrical signal indicative of a phase difference between the second comb line and the second beacon line; and
a circuit adapted to generate, based on the first and second electrical signals, one or more control signals that are applied to the second OFCS to lock (i) the phase of the first comb line to the phase of the first beacon line and (ii) the phase of the second comb line to the phase of the second beacon line.

20. The apparatus of claim 19, wherein the circuit adapted to generate comprises:
a first compensation circuit adapted to generate a first control signal based on the first electrical signal;
a second compensation circuit adapted to generate a second control signal based on the second electrical signal;
a first plurality of weighting blocks, each adapted to weight the first control signal to generate a respective weighted signal;
a second plurality of weighting blocks, each adapted to weight the second control signal to generate a respective weighted signal; and
a plurality of summation nodes, each adapted to sum (i) a weighted signal received from a respective weighting block of the first plurality and (ii) a weighted signal received from a respective weighting block of the second plurality to generate a plurality of additional control signals.

21. The apparatus of claim 15, wherein:
the first beacon line is a first non-modulated component of the received WDM signal;
the second beacon line is a second non-modulated component of the received WDM signal; and
the received WDM signal comprises one or more data-modulated components corresponding to the first frequency comb.

22. The apparatus of claim 21, the detector is adapted to process the received WDM signal using homodyne detection, wherein one or more comb lines of the first frequency comb corresponding to the modulated components of the received WDM signal provide one or more local oscillator signals for said homodyne detection.

* * * * *